(12) United States Patent
Nguyen et al.

(10) Patent No.: US 7,970,873 B2
(45) Date of Patent: Jun. 28, 2011

(54) SYSTEM AND METHOD FOR ASSIGNING ADDRESSES TO INFORMATION HANDLING SYSTEMS

(75) Inventors: Cuong Nguyen, Austin, TX (US); Michael A. Brundridge, Georgetown, TX (US); Bruce Holmes, Austin, TX (US); Michael Roberts, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 240 days.

(21) Appl. No.: 12/326,500

(22) Filed: Dec. 2, 2008

(65) Prior Publication Data

US 2009/0077208 A1    Mar. 19, 2009

Related U.S. Application Data

(63) Continuation-in-part of application No. 11/554,090, filed on Oct. 30, 2006.

(51) Int. Cl.
| G06F 15/177 | (2006.01) |
| G06F 15/173 | (2006.01) |
| G06F 15/16 | (2006.01) |
| G06F 9/26 | (2006.01) |
| G06F 9/34 | (2006.01) |
| G06F 11/00 | (2006.01) |
| G06F 1/00 | (2006.01) |

(52) U.S. Cl. ........ 709/221; 709/220; 709/223; 709/225; 709/232; 709/245; 711/200; 370/235; 370/245; 713/300

(58) Field of Classification Search ................. 370/235, 370/254; 709/220, 223, 225, 232, 245; 713/300; 361/724; 711/447, 200
See application file for complete search history.

(56) References Cited

U.S. PATENT DOCUMENTS

| 6,928,478 | B1 | 8/2005 | Gangadharan | |
| 7,389,462 | B1 * | 6/2008 | Wang et al. | 714/748 |
| 7,739,543 | B1 * | 6/2010 | Pittman et al. | 714/7 |
| 2003/0033409 | A1 * | 2/2003 | King et al. | 709/225 |
| 2005/0138439 | A1 * | 6/2005 | Rothman et al. | 713/300 |
| 2005/0207448 | A1 * | 9/2005 | Iyer et al. | 370/476 |
| 2006/0045089 | A1 * | 3/2006 | Bacher et al. | 370/392 |
| 2006/0059325 | A1 * | 3/2006 | Milne et al. | 711/200 |
| 2007/0027973 | A1 * | 2/2007 | Stein et al. | 709/223 |
| 2007/0156974 | A1 * | 7/2007 | Haynes et al. | 711/147 |
| 2008/0211427 | A1 * | 9/2008 | Budde et al. | 315/294 |
| 2009/0216898 | A1 * | 8/2009 | Meng et al. | 709/232 |

* cited by examiner

*Primary Examiner* — Ario Etienne
*Assistant Examiner* — Ho Shiu
(74) *Attorney, Agent, or Firm* — Hamilton & Terrile, LLP; Robert W. Holland

(57) ABSTRACT

Information handling system network addresses are managed to support a consistent MAC address for iSCSI and fiber channel host bus adapter. For example, a management controller retrieves a MAC address from persistent memory, such as a network location, and assigns the MAC address to a non-persistent memory of a predetermined information handling system network component so that the MAC address remains consistent even if the network component is replaced. For example, an offload engine that supports network communications with iSCSI receives a MAC address from a network location and applies the MAC address for use by a host bus adapter. Alternatively, an offload engine supports Fiber Channel with World Wide Name or World Wide Identifier address assignments.

19 Claims, 6 Drawing Sheets

SYSTEM AND METHOD FOR ASSIGNING ADDRESSES TO INFORMATION HANDLING SYSTEMS

RELATED APPLICATIONS

The present application claims priority as a continuation-in-part of U.S. patent application Ser. No. 11/554,090 entitled "System and Method for Assigning Addresses to Information Handling Systems," by Cuong Nguyen, Michael Brundridge, Bruce Holmes and Michael Roberts, filed on Oct. 30, 2006.

BACKGROUND OF THE INVENTION

1. Field of the Invention

The present invention relates in general to the field of information handling system networking, and more particularly to a system and method for assigning addresses to information handling systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Networked information handling systems provide support for many business and personal applications. Enterprises often network information handling systems to use common storage, to enhance communications between employees and to leverage the use of peripherals, such as common printers. Individuals commonly access a variety of networks using modems or wireless access points to retrieve news, track finances or communicate with e-mail and instant messages. Typically, behind each network is one or more server information handling systems that coordinate communication of information between network clients. Large enterprises will often dedicate rooms that support multiple server information handling systems with specialized cooling and power equipment. In some instances, multiple servers known as blades operate from a common chassis to conserve space while sharing cooling and power equipment. Large enterprise networks often have a variety of support organizations responsible for the deployment and maintenance of network resources, such as clients, servers, Ethernet local area network (LAN) connections and storage area networks (SANs). In such enterprise networks, deployment and maintenance tasks typically are closely coordinated. For example, if a server information handling system or IO module is replaced, MAC and WWN addresses assigned to the replaced systems have to be updated in a variety of security, deployment and networking databases in the LAN and SAN.

A variety of techniques have evolved that attempt to automate address assignments in response to information handling system server equipment changes. One solution uses an external switch to translate MAC addresses assigned to server information handling systems and related devices to external MAC addresses used by clients to communicate with the information handling system servers and related devices. Essentially, a switch is placed between the servers and clients so that a map incorporated with the switch is available to translate the MAC addresses associated with the servers to MAC addresses used by the network for the servers. This solution supports changes to server information handling systems that alter the server MAC addresses by reprogramming the map in the separate switch so that the replacement MAC addresses map to the MAC addresses used by the network. However, this solution requires a separate hardware device to support the map, which presents a single point of failure and requires reprogramming with each change to the server information handling systems.

Similar difficulties arise with networked storage devices, such as iSCSI devices, which allow clients known as initiators to send SCSI commands to storage devices on remote servers through Internet Protocol networks. To coordinate network communications, an iSCSI offload engine (iSOE) uses a dedicated MAC address that is different from the local area network (LAN) MAC address. If an iSCSI offload engine has an IP addressed dynamically assigned by a DHCP server, and the MAC address of the Iscsi offload engine changes due to a hardware replacement, the dynamically assigned IP address typically must be manually released and reassigned to the replacement hardware. After reassignment of the IP address, switches and routers downstream from the new hardware device have to re-learn the MAC address. This process typically takes time and network administrator expertise. In some instances, iSCSI volumes in a storage array are configured such that only a defined IP address or range of IP addresses can communicate with a give iSCSI volume. If the iSCSI HBA is configured to use DHCP and the MAC address changes, network administrators generally must either make changes to the DHCP to maintain the same IP addresses or change the iSCSI volume configuration to allow the HBA's new IP address to communicate with the volume.

SUMMARY OF THE INVENTION

Therefore a need has arisen for a system and method which maintains network addresses in the event of changes to hardware of the network.

A further need exists for a system a method which maintains network MAC addresses in a storage network environment.

In accordance with the present invention, a system and method are provided which substantially reduce the disadvantages and problems associated with previous methods and systems for maintaining network addresses in the event of changes to hardware of the network. Network addresses are stored at a location and assigned to support network communications of information handling systems based on the location of the information handling system. A pre-power manager of the information handling system retrieves network addresses associated with the location of the information handling system from persistent memory of the location and applies the network addresses to power up networking components of the information handling system to communicate through the network with the network addresses. MAC addresses are maintained consistent at network components, such as iSCSI or FCoE host bus adapters, even if an information handling system or network component is replaced.

More specifically, a blade information handling system chassis has plural slots, each slot supporting operation of a blade information handling system. Persistent storage associated with the chassis stores network addresses for use by blade information handling systems inserted in the slots, such as MAC and WWN addresses. A chassis management controller interfaced with the persistent memory retrieves the addresses and provides the addresses associated with each slot to a baseboard management controller of a blade information handling system inserted in each slot, such as through a management bus of the chassis. The baseboard management controller applies the network addresses associated with its slot to power up networking components to communicate with the network addresses. The network addresses applied by the baseboard management controller are not saved to persistent memory so that the addresses remain associated with the location in the event that the blade information handling system is removed from the slot. In one embodiment, blade information handling systems removed from the chassis retain the same address by removing the address information from the persistent memory of the chassis and inserting the address information in persistent memory of another chassis to support the removed blade information handling system.

The present invention provides a number of important technical advantages. One example of an important technical advantage is that network addresses within a network structure are automatically maintained when server information handling systems or related devices are changed or replaced. Thus, during replacement of server equipment the security, network and deployment databases that coordinate operation of the network continue to operate with existing network addresses without added external devices, such as a switch having network mapping. By assigning addresses before each boot, server information handling systems power up prepared to support communications through traditional communication paths, such as Ethernet. By removing addresses at power down, inadvertent duplication of addresses is prevented due replacement of equipment. In one embodiment, assignment of MAC addresses to an offload engine supports consistent MAC address assignments for use in network storage environments, such as iSCSI or FCoE environments.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Associating network addresses to a location for use by an information handling system reduces complexities associated with replacing and moving information handling systems. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
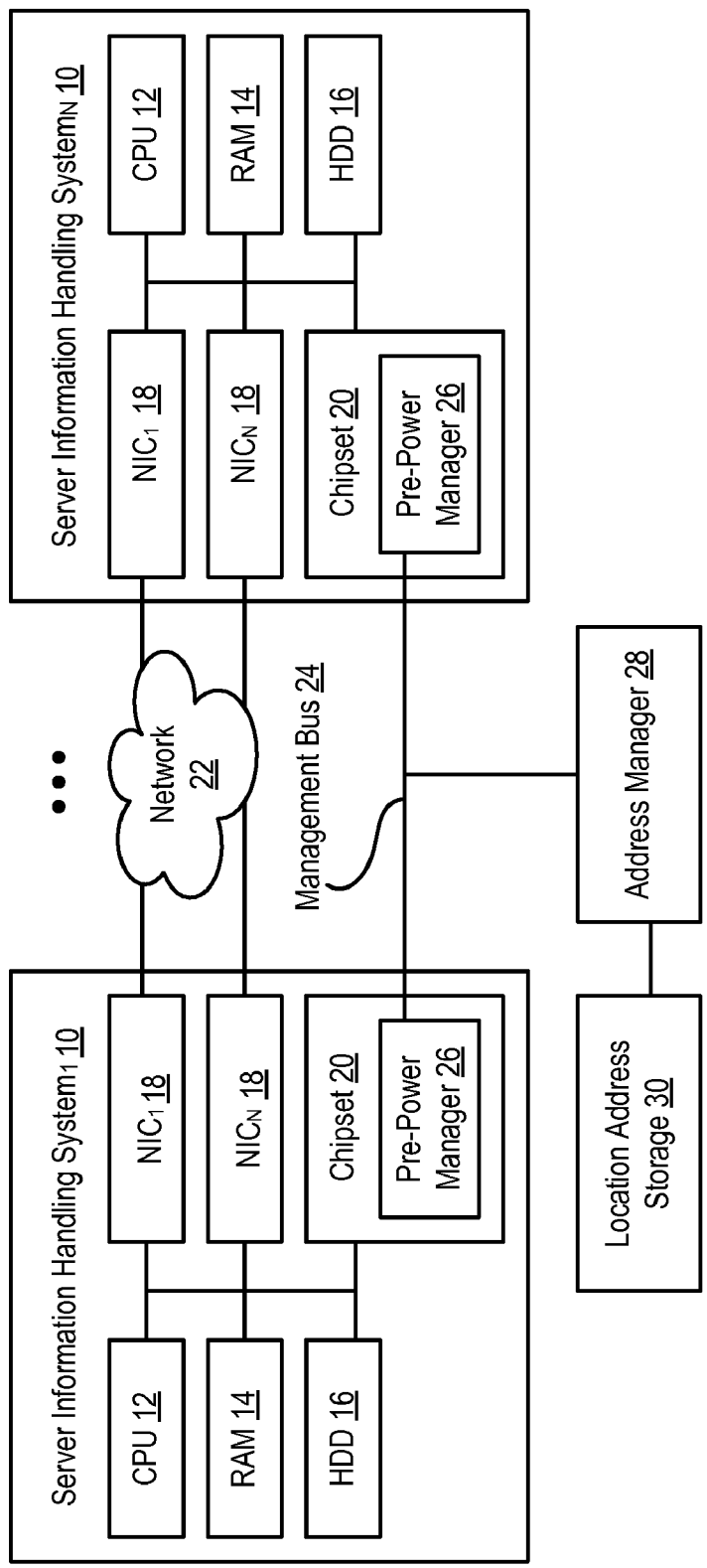
FIG. 1 depicts a block diagram of server information handling systems configured to apply location-based network addresses.

Referring now to FIG. 1, a block diagram depicts server information handling systems 10 configured to apply location-based network addresses. Server information handling systems 10 have plural processing components that cooperate to process information, such as a CPU 12, RAM 14, a hard disk drive 16, network interface cards 18 and a chipset 20. Plural network interface cards 18 coordinate the communication of information with a network 22, such as a local area network or a storage area network. A management bus 24, such as an I2C bus or SMBus, supports communication of management information through pre-power manager 26. For example, pre-power manager 26 operates with most processing components in a powered down state to support remote power-up, power-down and maintenance of server information handling systems 10 through management bus 24. An address manager 28 interfaces with pre-power manager 26 through management bus 24 in order to apply network addresses retrieved from local address storage 30. Local address storage 30 resides in persistent memory associated with a location, such as a physical spot in a server room or multi-server chassis. Each specific location has associated network addresses that are retrieved for use by information handling systems placed at the associated location. Address manager 28 provides the network addresses, such as MAC and WWN addresses, to pre-power manager 26 so that the addresses are available for networking components, such as NICs 18, at power up of the components. Pre-power manager 26 applies the network addresses at power up of the networking components so that network communications are supported with the network addresses retrieved from location address storage 30. Pre-power manager 26 applies the network addresses so that, if the information handling system is subsequently moved then the addresses will not remain on the information handling system. For example, the network addresses are stored in non-persistent memory of information handling system 10.

Figure 2:
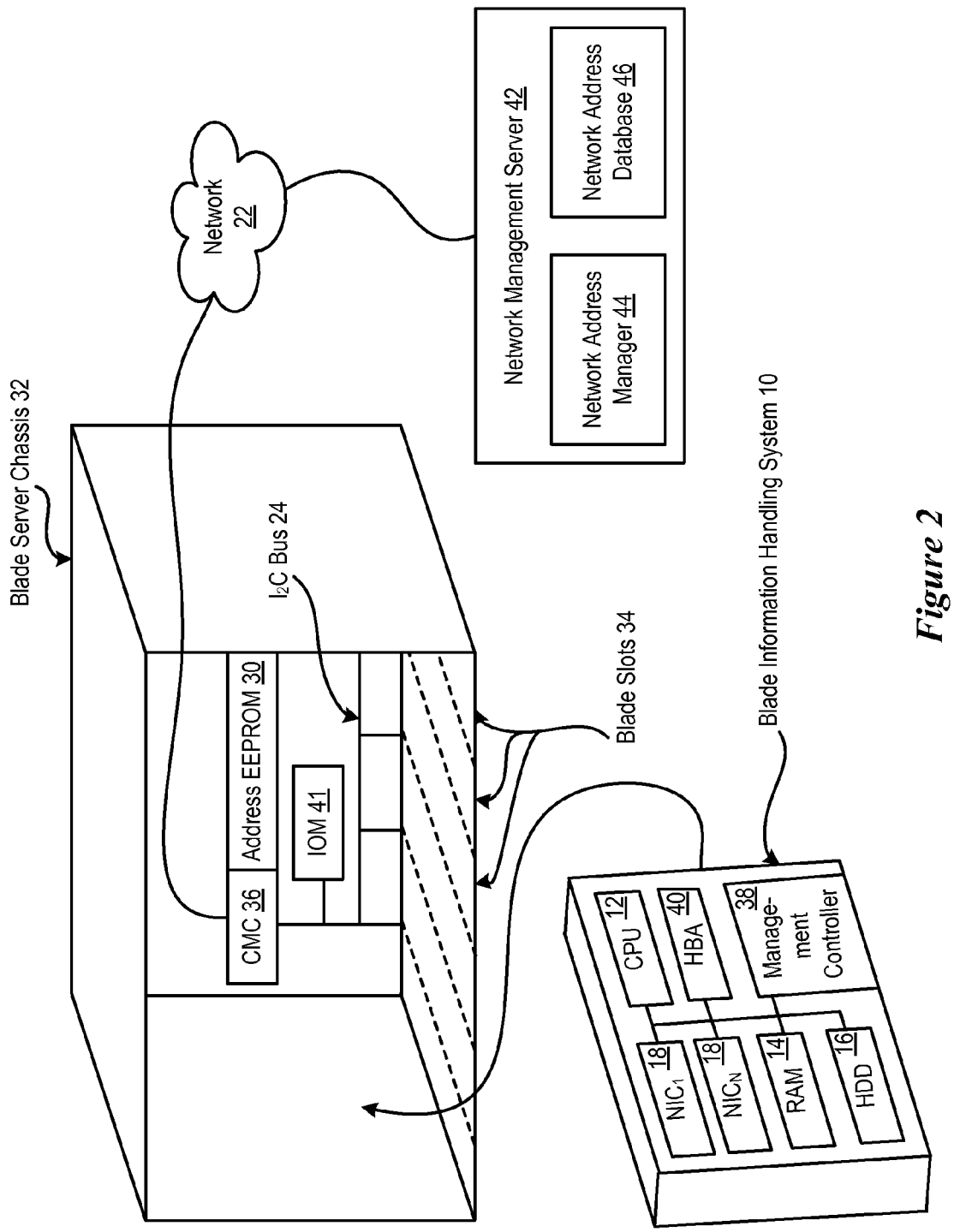
FIG. 2 depicts a block diagram of a blade server information handling system and chassis configured to apply network addresses based on the slot location used to support the information handling system.

Referring now to FIG. 2, a block diagram depicts a blade server information handling system 10 and a blade server chassis 32 configured to apply network addresses based on the slot location used to support the blade information handling system 10. Blade server chassis 32 has plural slots 34 each of which accept a blade information handling system. Blade server chassis 32 has a chassis management controller 36 that manages the operation of blade information handling systems 10 in slots 34 through a management bus 24. A management controller 38, such as a baseboard management controller (BMC) or integrated management controller (IMC), in each blade information handling system 10 communicates with chassis management controller 36 to manage operations such as powering up and powering down blade information handling system 10. With chassis management controller 36 and management controller 38 powered up and blade information handling system powered down, network addresses, such as MAC and WWN addresses, associated with a slot 34 are retrieved from address EEPROM 30 to enable configuration of network components, such as a NIC, LOM, and FC HBA 40, before power is applied to the network components. An IOM 41 located on chassis 32 also includes an Ethernet controller having a MAC address supported by information stored in EEPROM 30.

After the network addresses are available to the networking components for establishing network communication, chassis management controller 36 authorizes management controller 38 to power up blade information handling system 10 configured to communicate over network 22. The network addresses are stored in address EEPROM 30 in a number of ways. In one embodiment, address EEPROM 30 has unique MAC and WWN addresses registered with appropriate authorities and stored at manufacture of blade server chassis 32. In an alternative embodiment, a network management server 42 dynamically assigns network addresses with a network address manager 44 selecting from available addresses of a network address database 46. Chassis management controller 36 requests network addresses during its boot, such as by extending the DHCP protocol so that the MAC and WWN addresses are requested along with an IP address. Network addresses retrieved from network management server 42 may be stored in persistent memory of blade server chassis 32 for subsequent use.

Figures 3, 4:
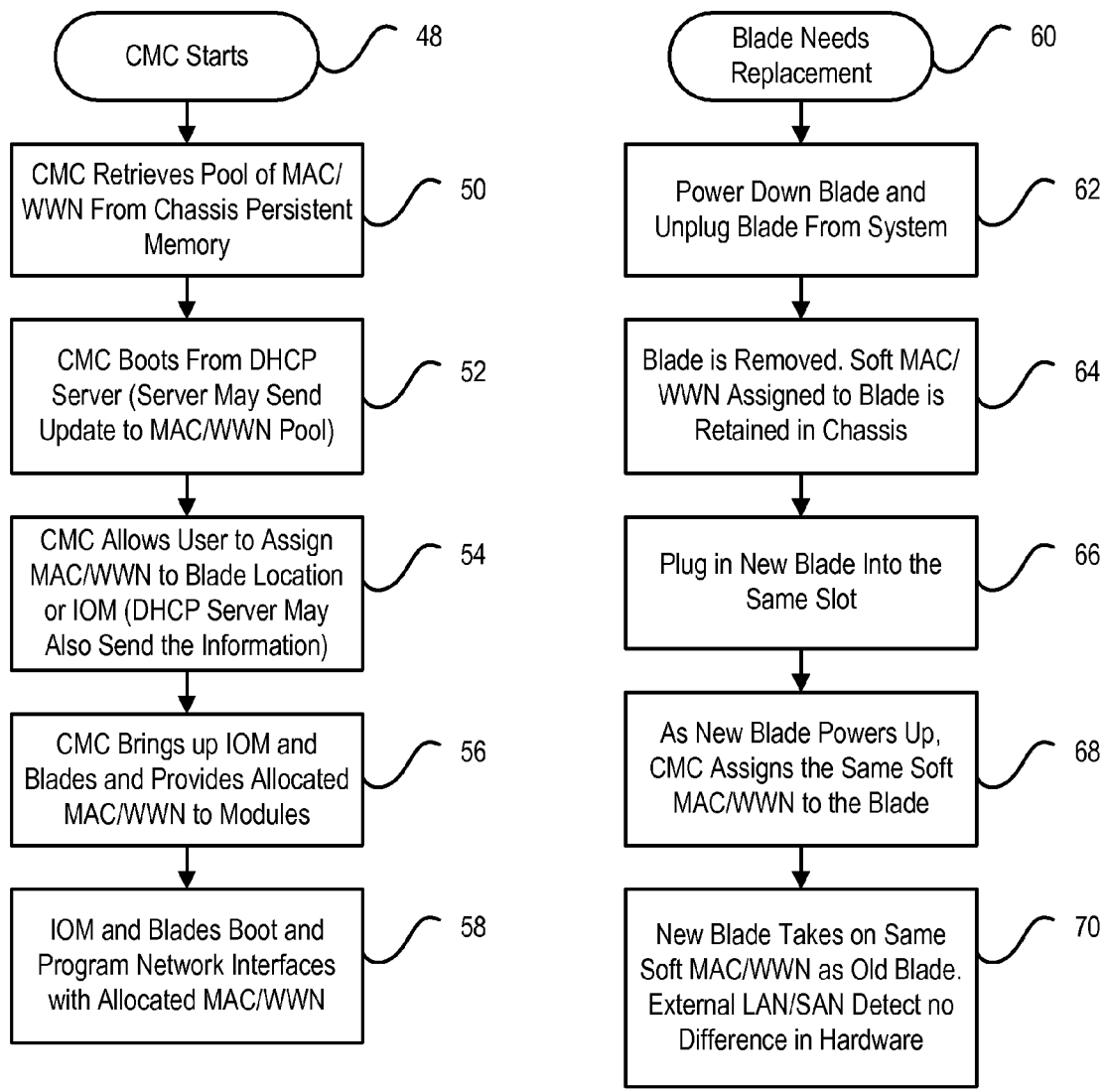
FIG. 3 depicts a flow diagram of a process for powering up blade information handling system network components to communicate with addresses managed by a chassis management controller.
FIG. 4 depicts a flow diagram of a process for replacing a blade information handling system in a blade chassis slot.

Referring now to FIG. 3, a flow diagram depicts a process for powering up blade information handling system network components to communicate with addresses managed by a chassis management controller. At step 48, the chassis management controller starts. At step 50, the chassis management controller retrieves a pool of "soft" MAC and WWN addresses from the blade chassis persistent memory. At step 52, the chassis management controller boots from a DHCP server to establish network communication for the blade server chassis. In addition to retrieving an IP address, the chassis management controller may retrieve MAC and WWN addresses as a modification to the DHCP protocol. At step 54, the chassis management controller allows assignment of MAC and WWN addresses to blade or IOM locations of the blade server chassis. Alternatively, the DHCP server may send chassis slot assignment information. At step 56, the chassis management controller brings up the IOMs and blades and provides the allocated MAC and WWN addresses to each module. At step 58, the IOMs and blades boot and program the network interfaces with the allocated MAC and WWN addresses.

Referring now to FIG. 4, a flow diagram depicts a process for replacing a blade information handling system in a blade chassis slot. The process begins at step 60 with a decision to replace a blade information handling system. At step 62, the blade information handling system is powered down and unplugged from the blade server chassis. At step 64, the blade information handling system is physically removed from its slot in the chassis, although the soft MAC and WWN addresses assigned to the blade are not retained in the blade but rather retained in the chassis. At step 66, the new blade information handling system is plugged into the chassis slot of the removed blade information handling system. At step 68, the new blade information handling system powers up and the chassis management controller assigns the MAC and WWN addresses associated with the slot and formerly used by the removed blade to the replacement blade information handling system. At step 70, the replacement blade information handling system applies the same MAC and WWN addresses as the removed blade so that the LAN or SAN detects no difference in hardware.

Figure 5:
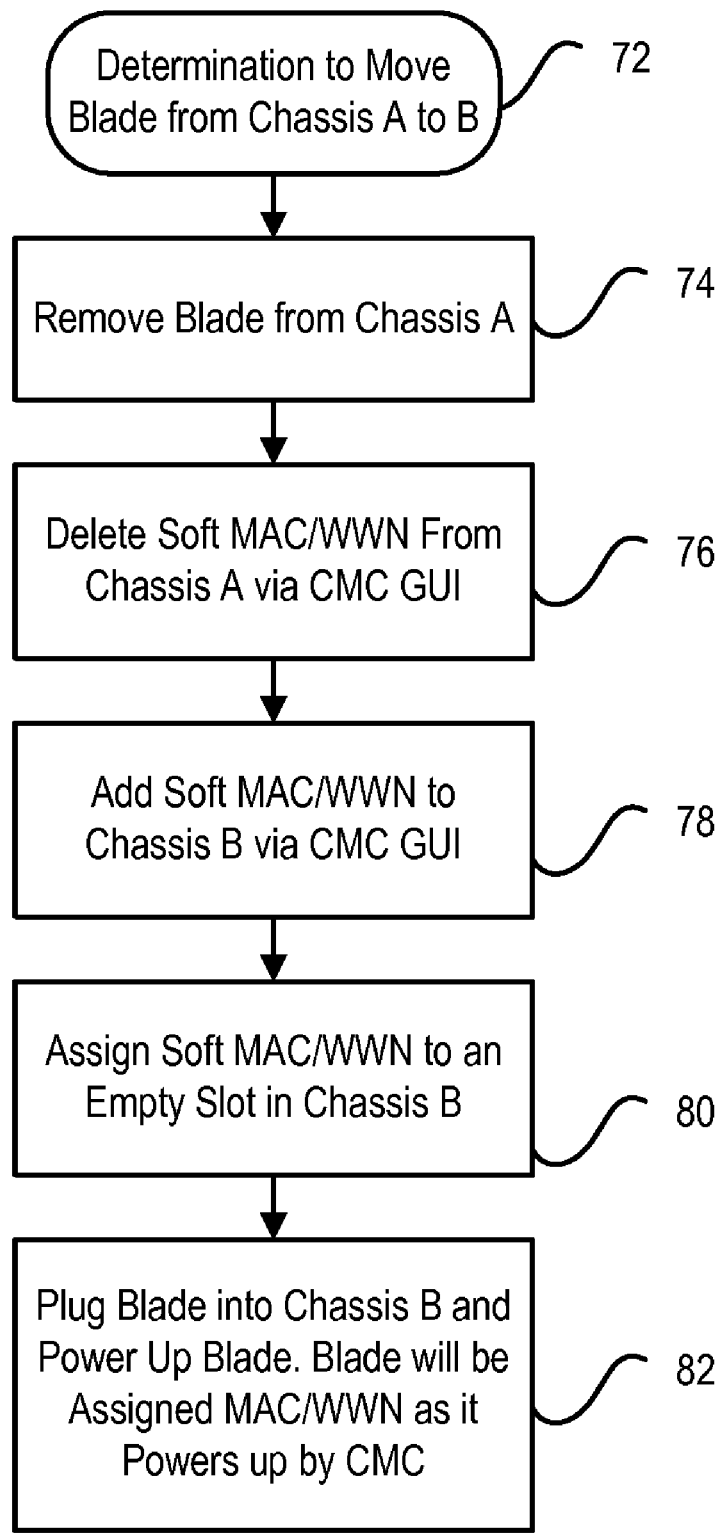
FIG. 5 depicts a flow diagram of a process for moving a blade information handling system from a first to a second chassis with the same network addresses used by the blade information handling system in each chassis.

Referring now to FIG. 5, a flow diagram depicts a process for moving a blade information handling system from a first to a second chassis with the same network addresses used by the blade information handling system in each chassis. The process starts at step 72 with a determination to move a blade information handling system from a first to a second chassis. At step 74, the blade information handling system is removed from the first chassis. At step 76 the soft MAC and WWN addresses associated with the blade information handling system are deleted from the first chassis. At step 78, the soft MAC and WWN addresses are added to the second chassis and, at step 80, associated with an empty slot in which the blade information handling system is to be inserted. At step 82, the blade information handling system is plugged into the selected chassis slot and powered up so that the MAC and WWN addresses previously used by the blade in the first chassis are once again used by the blade in the second chassis.

Figure 6:
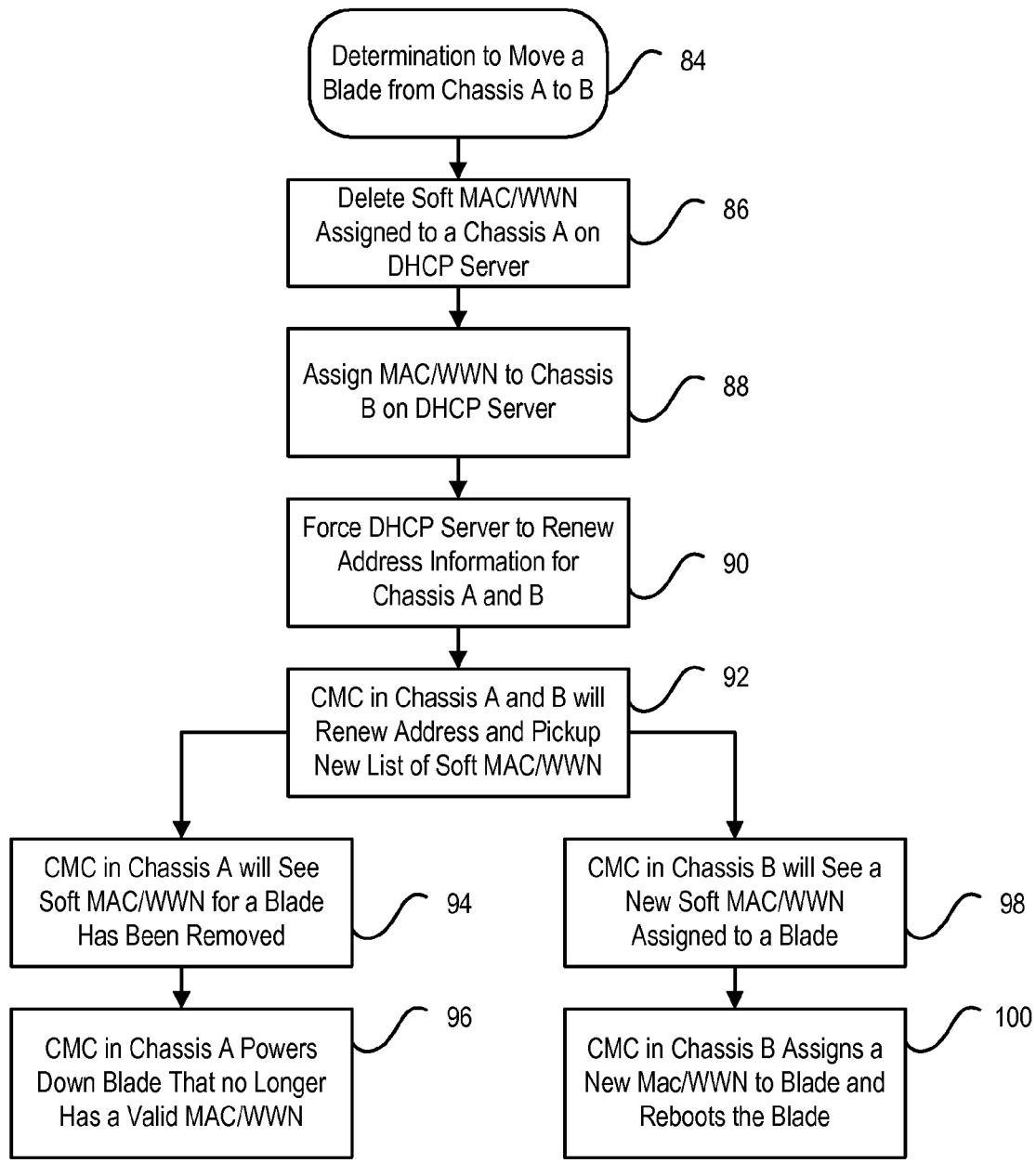
FIG. 6 depicts a flow diagram of a process for moving a blade information handling system to a remote location with dynamic address assignments.

Referring now to FIG. 6, a flow diagram depicts a process for moving a blade information handling system to a remote location with dynamic address assignments. At step 84 a determination is made to move a blade from a first to a second chassis. At step 86, the soft MAC and WWN addresses associated with the blade are deleted from assignment to the first chassis at the DHCP server. At step 88, the soft MAC and WWN addresses associated with the blade are added to the assignments of the second chassis at the DHCP server. At step 90, the DHCP server is forced to renew the address information at the first and second chassis. At step 92, the chassis management controllers of the first and second chassis renew the addresses and pick up the new list of soft MAC and WWN addresses from the DHCP server. At step 94, the chassis management controller in the first chassis sees that the soft MAC and WWN addresses for a blade are removed. At step 96, the chassis management controller of the first chassis down the blade that lacks valid MAC and WWN address information. At step 98, the chassis management controller of the second chassis sees the new soft MAC and WWN addresses assigned to the blade. At step 100, the chassis management controller in the second chassis assigns the new MAC and WWN addresses to the blade information handling system and reboots the blade to apply the addresses.

Figure 7:
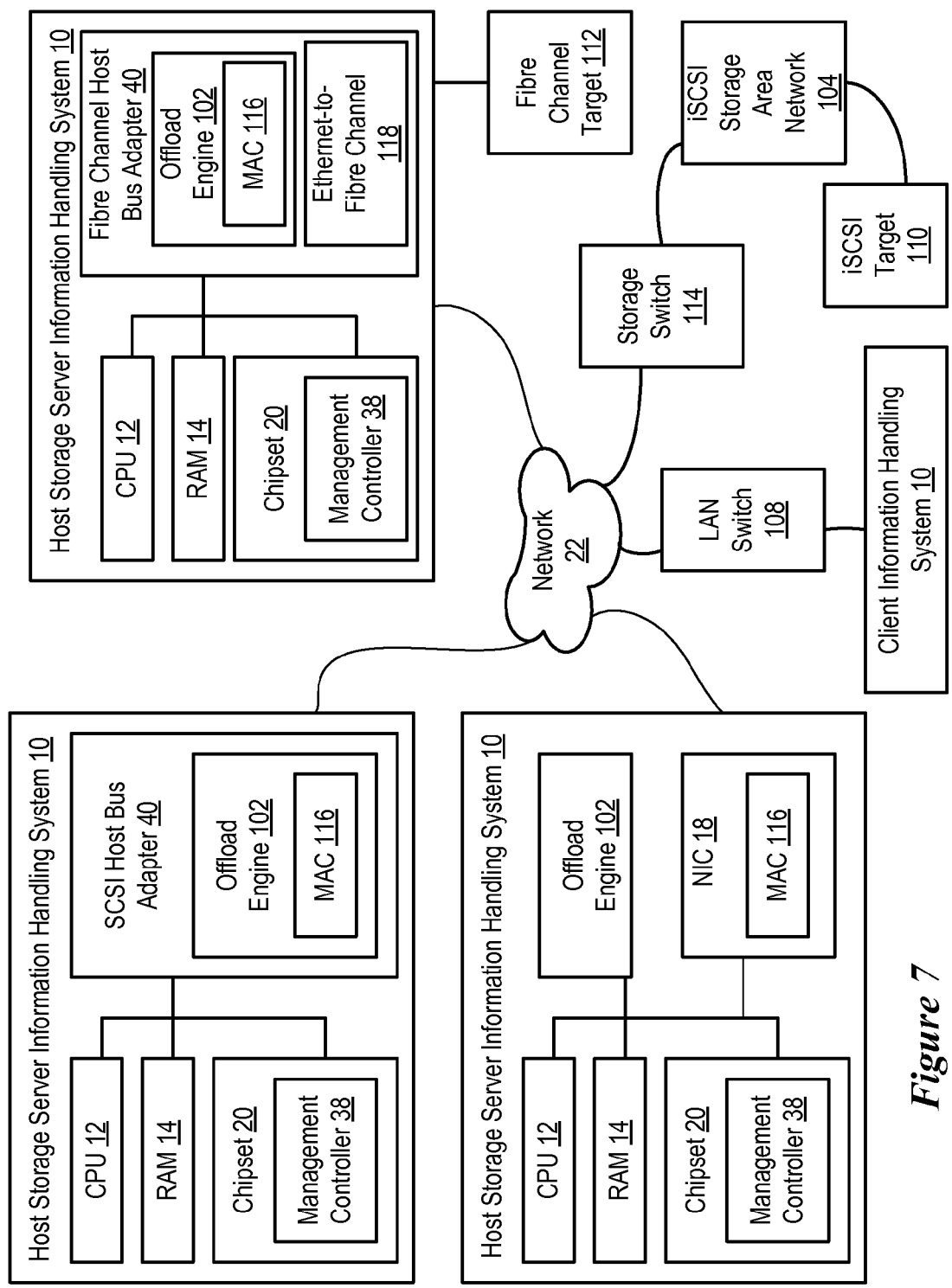
FIG. 7 depicts a block diagram of a system for maintaining a consistent MAC address with a host bus adapter and offload engine.

Referring now to FIG. 7, a block diagram depicts a system for maintaining a consistent MAC address with a host bus adapter 40 and offload engine 102. Host bus adapter 40 and offload engine 102 provide support for storage area networks that store information using Internet protocol techniques, such as an iSCSI storage area network 104 or a fiber channel over Ethernet network 106. Client information handling systems 10 access storage area networks through host server information handling systems 10, which act as initiators to iSCSI targets 110 and fiber channel targets 112. Communications between client information handling systems 10, host server information handling systems 10, and targets 110 and 112 pass through a network 22 having a variety of network devices, such as local area network switch 108 and a storage switch 114. Host bus adapters 40 promote use of Internet Protocol communications by presenting storage devices as network devices using a MAC address 116 assigned by offload engine 102. Offload engine 102 operates as firmware instructions running on host bus adapter 40 or, alternatively, operates independently to assign a virtual MAC address 116 to a network interface card 18 which performs host bus adapter functions under instructions run on CPU 12 or firmware run on chipset 20. A fiber channel host bus adapter 40 has multiple World Wide Name (WWN) addresses, also known as World Wide Identifiers (WWID), assigned for each port by offload engine 102 to support Ethernet-to-fiber channel function 118.

In order to maintain consistent MAC addresses for host bus adapters 40 and offload engines 102, a management controller 38 associated with a host server information handling system 10 retrieves a MAC address from persistent memory and applies the MAC address to non-persistent memory for use by host bus adapter 40 and/or offload engine 102. For example, management controller 38 runs as firmware on chipset 20 or other processing components associated with an information handling system 10 having networking components with assignable MAC addresses, such as firmware on a baseboard management controller. In the embodiment depicted by FIG. 7, management controller 38 retrieves MAC addresses from a network address manager 44 and network address database 46 of a network management server 42 and applies the MAC address to a predetermined network component, such as an offload engine 102 or host bus adapter 40. As is discussed above in greater detail, the MAC address assigned to the network component is maintained consistent even if the network component or information handling system 10 having the network component is replaced. For example, MAC addresses are provided from network management server 42 based on the position of an information handling system 10 within a chassis, such as a blade slot location in a blade chassis. Thus, for example, if a blade information handling system configured to support iSCSI with an offload engine 102 is replaced with a replacement blade information handling system, the MAC address of the replacement blade information handling system offload engine 102 is the same as the MAC address of the system that was replaced. Similarly, if a host bus adapter 40 is replaced in an information handling system 10, the configuration of the information handling system to interact with iSCSI storage area network 104 remains unchanged because the same MAC address is assigned to the replacement host bus adapter 40 as was used by the replaced host bus adapter 40.

WWN addresses associated with a fiber channel host bus adapter 40 are also maintained consistent by assigning the WWN address to the fiber channel host bus adapter 40 from the pool of WWN addresses maintained in network management server 42. Fiber channel over Ethernet uses burnt-in WWN addresses during the FIP phase of communication, however, as part of FIP discovery and login, a new mapped WWN address is configured, such as a WWN address provided from network management server 42 through out-of-band communication with management controller 38. The mapped WWN address is used by a FCoE end node 112 during data transfers. During the FIP phase, end node target 112 and FCoE storage switches agree on the WWN address. An FCoE forwarder function in the FCoE switch chooses an SPMA method with burnt-in WWN addresses that support a flexible WWN address or FPMA. Multiple WWN addresses may be burnt in to support FCoE functions and LAN functions. In both iSCSI and FCoE environments, a pool of available MAC or WWN addresses are maintained in persistent memory for assignment to predetermined network components at power up of the components, with the network components storing assigned MAC addresses in non-persistent memory so that multiple instances of a MAC address do not occur when a network component is replaced.

Although the present invention has been described in detail, it should be understood that various changes, substitutions and alterations can be made hereto without departing from the spirit and scope of the invention as defined by the appended claims.

What is claimed is:
1. An information handling system comprising:
a processor operable to process information;
a network component interfaced with the processor and operable to communicate information with a network using a Media Access Control (MAC) address;
a management controller in communication with the processor, the management controller operable to interface with an address manager to retrieve a MAC address associated with the network component and to apply the MAC address to the network component for communication of information through the network, wherein the MAC address is stored in persistent memory on the network component;
wherein the management controller is further operable to delete the MAC address from the persistent memory on network component at power down of the network component.
2. The information handling system of claim 1 wherein the network component comprises a network interface card.
3. The information handling system of claim 1 wherein the network component comprises a storage area network.
4. The information handling system of claim 1 wherein the management controller comprises firmware running on a chipset.
5. The information handling system of claim 4 wherein the management controller comprises a baseboard management controller.
6. The information handling system of claim 5 further comprising:
persistent memory associated with the network component and operable to store the MAC address;
wherein the management controller is further operable to retrieve the MAC address from the persistent memory and to apply the MAC address to the network component.
7. The information handling system of claim 1 wherein the management controller is further operable to retrieve plural MAC addresses for use by the network component.
8. A method for managing network Media Access Control (MAC) addresses associated with information handling system network components, the method comprising:
storing network MAC addresses in persistent memory accessible by the information handling systems;

retrieving with a management controller one or more of the network MAC addresses associated with a predetermined network component;

applying the network MAC address to the predetermined network component, wherein the MAC address is stored in persistent memory on the predetermined network component;

powering up the network component to establish network communications with the network MAC address; and deleting the MAC address from the persistent memory on the predetermined network component at power down of the predetermined network component.

9. The method of claim 8 wherein applying the network MAC address further comprises applying the network MAC address with non-persistent memory so that the network MAC address is deleted at power down of the information handling system.

10. The method of claim 8 wherein the network component comprises a host bus adapter.

11. The method of claim 8 wherein the host bus adapter comprises an iSCSI host bus adapter.

12. The method of claim 8 further comprising:
removing the predetermined network component from the information handling system;
inserting a replacement network component in the place of the removed predetermined network component; and
powering up the replacement network component to operate with the one or more network addresses associated with the removed predetermined network component.

13. The method of claim 8 wherein the network component comprises an iSCSI offload engine that assigns a network address to a network interface card.

14. The method of claim 8 wherein the network MAC addresses comprise plural MAC addresses.

15. The method of claim 8 wherein the network component comprises an iSCSI host bus adpater.

16. A system for assigning network addresses to an information handling system network component, the system comprising:
a management controller operable to retrieve a Media Access Control (MAC) address associated with the network component and assign the MAC address to the network component; and
a network component interfaced with the management controller and operable to apply the MAC address provided by the management controller, wherein the MAC address is stored in persistent memory on the network component for communication through a network and to delete the MAC address from the persistent memory on the network component at power down of the network component.

17. The system of claim 16 wherein the network component comprises an offload engine, the offload engine operable to assign the MAC address to a host bus adapter.

18. The system of claim 16 wherein the network component comprises an iSCSI host bus adapter.

19. The system of claim 16 wherein the network component comprises a fibre channel host bus adapter and the network address comprises a World Wide Name address.

* * * * *